United States Patent
Vermeeren

(10) Patent No.: US 6,572,777 B1
(45) Date of Patent: Jun. 3, 2003

(54) METHOD FOR PURIFYING THE COOLING CIRCUIT OF AN ALTERNATOR STATOR OPERATING IN VENTILATED CIRCUIT, AND IMPLEMENTING DEVICE

(75) Inventor: Didier Vermeeren, Villers sur Coudun (FR)

(73) Assignee: Electricite de France Service National (FR)

( * ) Notice: Subject to any disclaimer, the term of this patent is extended or adjusted under 35 U.S.C. 154(b) by 0 days.

(21) Appl. No.: 09/622,750
(22) PCT Filed: Feb. 23, 1998
(86) PCT No.: PCT/FR98/00354
§ 371 (c)(1),
(2), (4) Date: Oct. 6, 2000
(87) PCT Pub. No.: WO99/43070
PCT Pub. Date: Aug. 26, 1999

(51) Int. Cl.[7] .................................................. C02F 1/42
(52) U.S. Cl. ..................... 210/681; 210/739; 210/97; 210/253; 210/263
(58) Field of Search .............................. 210/660, 681, 210/739, 97, 253, 263

(56) References Cited

U.S. PATENT DOCUMENTS

| 4,430,129 A | 2/1984 | Gamer |
| 4,432,878 A | 2/1984 | Emshoff et al. |
| 4,434,058 A | 2/1984 | Emshoff et al. |
| 5,250,187 A | 10/1993 | Franks |
| 6,424,062 B1 * | 6/2002 | Adelmann et al. |

* cited by examiner

*Primary Examiner*—Betsey Morrison Hoey
(74) *Attorney, Agent, or Firm*—Piper Rudnick

(57) ABSTRACT

The invention concerns a method for purifying the cooling circuit of an alternator stator, characterized in that part of the water of the closed cooling circuit is derived upstream of the alternator towards the deionization circuit supplying the recovery tank, said deionization circuit comprising a mixed bed demineralization circuit and a treament circuit placed parallel to the demineralization circuit, and when the inflow rate into the deionization circuit is fixed at a value less than 10%, preferably less than about 20% of the nominal flow passing through the stator, the treatment circute consists in a cation-exchanging resin; when the inflow rate into the deionization circuit is fixed at a value higher than 10%, preferably higher than about 20% of the nominal flow passing through the stator, either the treatment circuit is interrupted, or the treatment circuit consists of a cation-exchanging resin or a mixed bed resin.

40 Claims, 2 Drawing Sheets

… continued …

Figure 1:
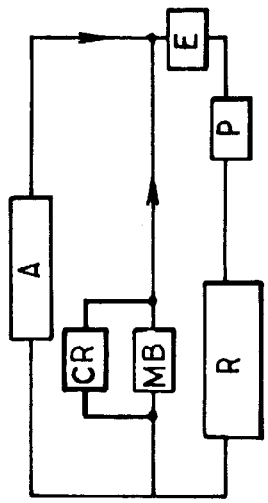

METHOD FOR PURIFYING THE COOLING CIRCUIT OF AN ALTERNATOR STATOR OPERATING IN VENTILATED CIRCUIT, AND IMPLEMENTING DEVICE

FIELD OF THE INVENTION

The present invention concerns a method for purifying the cooling circuit of an alternator stator operating in ventilated mode. It also concerns a device for implementing this method.

BACKGROUND OF THE INVENTION

Alternators in power stations are subjected to the passage of high-density currents which cause strong heating effects. To combat this heating, alternator stators comprise networks of stator bars which have hollow conductors made of copper in which the cooling water circulates.

In order to achieve the lowest possible conductivity of the cooling water, about 1% to 7% of the nominal flow of the water circulating in the stator is diverted towards a mixed-bed demineralisation resin.

A problem frequently encountered with this cooling system is the formation of deposits on the internal walls of the hollow conductors, which obstruct these conductors. Such obstructions lead to heating and, in the longer term, to frequent down-time of the alternator or to reductions in power load.

An attempted solution consists in conditioning the cooling circuits under air. However, this has not proved satisfactory in the long run as the phenomenon of obstruction persists.

To combat these obstructions, alternators have therefore been periodically stopped for chemical cleaning of the hollow copper conductors using acidic and/or complexing solutions. However, these cleaning operations are protracted, cause stopping of the machine and are often corrosive for the hollow conductors.

OBJECTS AND SUMMARY OF THE INVENTION

Thus a real need exists for a method of combating the formation of, and/or allowing the elimination of, the deposits responsible for obstructing the hollow copper conductors of alternator stators in a cooling circuit operating in ventilated mode. Such a method should not cause stopping of the alternator, should not cause high conductivity in the cooling water and should not cause major corrosion of the hollow copper conductors.

After lengthy research, the inventors have succeeded in developing such a method.

This method enables the formation of these deposits to be combated and, at the same time, allows the destruction of any deposits formed inside the hollow copper conductors, without stopping the alternator and without generating high conductivity, while causing minimal corrosion.

MORE DETAILED DESCRIPTION

Thus, the invention relates to a method of purifying the water circulating in the hollow copper conductors of an alternator stator the cooling circuit of which is conditioned in ventilated mode, according to which method the water of the closed cooling circuit of the alternator stator is drawn from the expansion tank by a pump, cooled and, if necessary, filtered in order to be fed to the hollow copper conductors of the alternator stator, characterised in that part of the water is diverted upstream of the alternator to a deionisation circuit feeding into the expansion tank, said deionisation circuit comprising a demineralisation circuit formed by a mixed-bed resin and a treatment circuit placed parallel to the demineralisation circuit, and characterised in that:

when the inflow rate into the deionisation circuit is fixed at a value less than 10%, and preferably less than about 20% of the nominal flow passing through the stator, the treatment circuit consists of a cation-exchanging resin, when the inflow rate into the deionisation circuit is fixed at a value greater than 10%, and preferably greater than or equal to about 20% of the nominal flow passing through the stator, either the treatment circuit is interrupted, or the treatment circuit consists of a cation-exchanging resin or of a mixed-bed resin.

Such a method can be used for all types of alternators cooled by a circulation of aerated water in hollow copper conductors in the stator bars forming the stator. As examples of such alternators one can cite all alternators of fossil-fuel fired thermal power stations or nuclear power stations with a power of at least 250 MW.

In the method according to the invention, the water diverted into the demineralisation circuit passes through a mixed-bed column capable of retaining both $HCO_3^-$ ions and $Cu^{2+}$ ions. Using such a column, the $Cu^{2+}$ ions resulting from the normal degradation of the internal wall of the copper conductors, which have a slightly alkaline character, are retained, as are the $HCO_3^-$ ions resulting from the dissolving of carbon dioxide from the air in the water, which have a slightly acidic character. Thus, the pH of the cooling water is kept neutral. Notable examples of mixed-bed columns are ARM 9882 of the ROHM & HAAS company and NRW 354 of the PUROLITE company.

When a cationic resin is employed, a cationic resin capable of retaining $Cu^{2+}$ ions is used. This resin is selected especially from resins of the NRW 160 type of the PUROLITE company and ARC 9652 of the ROHM & HAAS company.

According to the invention, when the water of the treatment circuit passes through a cation-exchanging resin, the process comprises a cycle of stages consisting of:

a) interrupting the demineralisation circuit while maintaining circulation in the treatment circuit;

b) restoring the operation of the demineralisation circuit while maintaining circulation in the treatment circuit.

Thus, during stage a), the $Cu^{2+}$ ions are trapped. The medium therefore becomes acidified as a result of the relative increase in the concentration of $HCO_3^-$. Now, the Applicant has demonstrated that the deposits responsible for the obstruction are deposits of CuO, which are formed by precipitation of the cupric ions and which dissolve more readily in an acidic milieu. The dissolving of the CuO deposits is therefore favoured during stage a).

However, if the concentration of $Cu^{2+}$ is too high, there is a risk that CuO will again be precipitated, and if the pH is too weak there is a risk that the copper will be depassivated and that there will be high rates of corrosion of the copper. This is why it is necessary to restore the operation of the demineralisation circuit. During stage b) the $HCO_3^-$ ions are trapped, so that the pH of the water will increase and, the concentration of dissolved copper being high, a large part of the copper will be precipitated. The pH will immediately become neutral again and the concentration of dissolved copper will diminish. When normal operating conditions are restored, stage a) is started again. Globally, more CuO is dissolved than is precipitated; this treatment therefore permits the elimination of the deposits responsible for the phenomenon of the obstruction of the hollow conductors.

The transition from stage a) to stage b) is therefore determined by the concentration of copper dissolved in the water upstream of the treatment circuit constituted by the cation-exchanging resin and by the pH of the water.

During the cationic purification, that is, when the treatment circuit consisting of a cationic resin is operating, the maximum permitted concentration of dissolved copper upstream of the treatment circuit is such that it does not allow precipitation of CuO, and the minimum permitted pH is such that it allows excessive corrosion of the hollow copper conductors to be avoided.

Thus, the maximum permitted concentration of dissolved copper is less than 200 ppb, and preferably below 180 ppb, and still more preferably below about 160 ppb.

The pH is controlled so as not to be less than 6.

The cycle of stages a) and b) is stopped when all the deposits responsible for the obstruction have been dissolved, and then the cation-exchanging resin of the treatment circuit is replaced by a mixed-bed resin so chosen that the two mixed-bed resins arranged parallel are capable of treating a flow of more that 10%, and preferably greater than or equal to about 20% of the nominal flow of water passing through the stator. With such a flow treated on the mixed bed the risk of formation of obstruction-causing deposits is substantially limited.

The mixed-bed resin introduced into the treatment circuit is preferably capable of treating a flow greater than 10%, and preferably greater than or equal to about 20% of the nominal flow passing through the stator, so that the demineralisation circuit can be interrupted to change a defective mixed bed if necessary. This circuit is then open and the demineralisation circuit closed. The defective mixed bed is replaced by a new mixed bed.

During a treatment according to the invention on an industrial site, it is considered that the deposits causing obstructions are dissolved about 4 months after the stator has recovered its original technical characteristics. It is considered that the stator has recovered its technical characteristics when the contamination coefficient Ke defined below has attained its limit value, a value corresponding to that calculated when the device is new.

$$Ke = \text{temperature of water in the bar} - \text{temperature of inflow into the stator}/(\text{active power})^2 + (\text{reactive power})^2$$

In the procedure according to the invention, when the treatment circuit consists of a mixed-bed resin, either the inflow rate into the demineralisation circuit has a value greater than 10%, and preferably greater than or equal to about 20% of the nominal flow passing through the stator, and the treatment circuit is interrupted, or inversely;

or both circuits are opened so that the water passes through both circuits.

In the latter case, the inflow rate into the deionisation circuit is greater than 10%, and preferably greater than or equal to about 20% of the nominal flow of water passing through the stator.

Thus, when the treatment circuit consists of a mixed-bed resin, it can be used for demineralisation jointly with the demineralisation circuit, or it can be used to replace any mixed-bed resin in the demineralisation circuit which has become defective. In the first case, therefore, the water passes through both circuits, while in the second case one of the circuits is interrupted so that the defective resin can be replaced.

Of course, the concentration of dissolved copper upstream of the deionisation circuit is far below the limiting threshold of 160 ppb determined above. Likewise, the pH is always above 6.

The present invention also relates to a device enabling the method described above to be implemented.

This device consists of a closed circuit for cooling water in the hollow copper conductors of the alternator stator comprising a pump, a cooling device, a filter if necessary, the alternator, an expansion tank and a deionisation circuit situated upstream of the alternator and feeding into the expansion tank, said deionisation circuit comprising a mixed-bed demineralisation circuit and a treatment circuit parallel to the demineralisation circuit, characterised in that:

when the inflow rate into the deionisation circuit is less than 10%, and preferably less than about 20% of the nominal flow of water passing through the stator, the treatment circuit consists of a cation-exchanging resin, when the inflow rate into the deionisation circuit is greater than 10%, and preferably greater than or equal to about 20% of the nominal flow of water passing through the stator, the treatment circuit consists of a mixed-bed resin or a cation-exchanging resin.

Given that the cooling circuit operates in ventilated mode, the device is such that level with the expansion tank there is a mixture of air and water, and especially if the water is well aerated, the oxygen content is between 4 and 8 ppm, in which case there is a partial air pressure significantly greater than 0.2 atm. Below this pressure blockages can again appear.

This device includes a means enabling the demineralisation circuit to be closed or opened while keeping open the parallel treatment circuit, and inversely.

Advantageously, this device also includes a means for monitoring the concentration of dissolved copper upstream and downstream of the demineralisation circuit, and means for monitoring the pH of the cooling water. In practice, these monitoring means consist of a valve for bleeding water from the cooling circuit, the measuring of concentration and pH of the water being carried out by conventional means.

In the device according to the invention, the mixed-bed column is able to retain both $HCO_3^-$ ions and $Cu^{2+}$ ions, and the cationic resin is able to retain, in particular, $Cu^{2+}$ ions.

The mixed-bed column can be a type ARM 9882 column of the ROHM & HAAS company or NRW 354 of the PUROLITE company.

The cationic resin can be of type NRW 160 of the PUROLITE company or ARC 9652 of the ROHM & HAAS company.

The present invention will now be described in more detail with reference to the drawings and to the example given for purely illustrative purposes.

IN THE DRAWINGS

Figure 2:
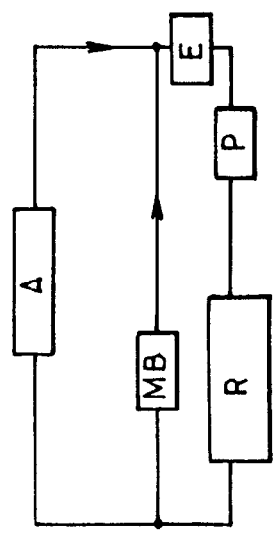
Figure 4:
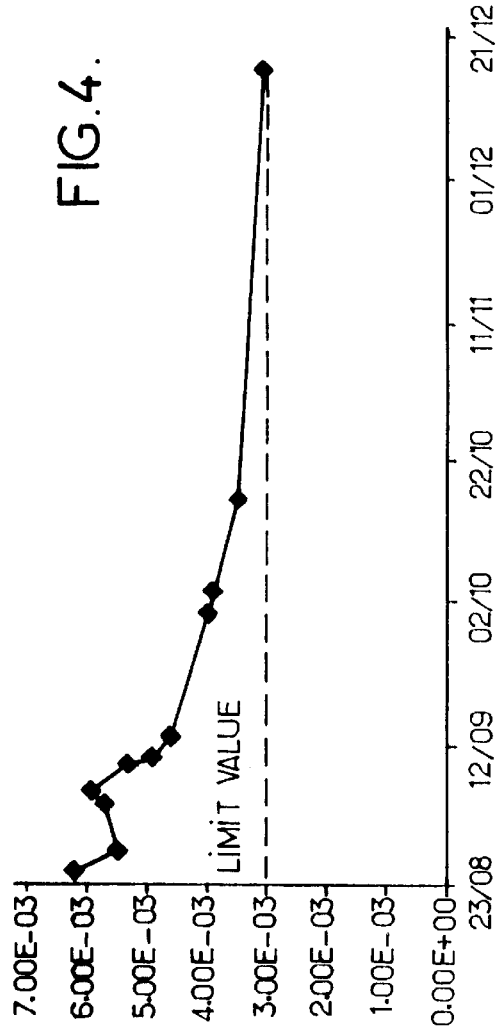
Figure 3:
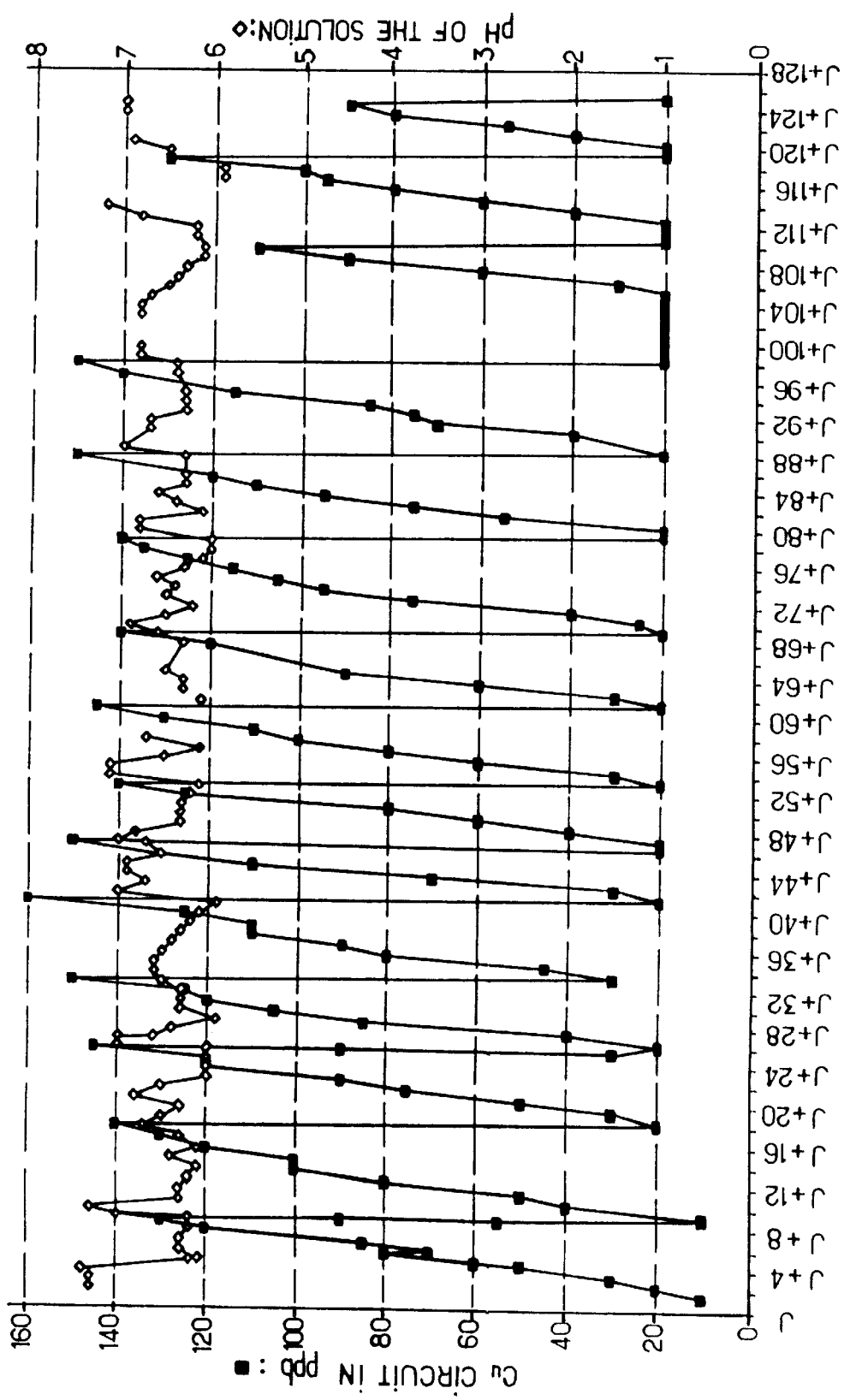

FIG. 1 is a schematic representation of a cooling circuit of an alternator stator operating in ventilated mode according to the prior art, FIG. 2 is a schematic representation of a purification circuit of a cooling circuit of an alternator stator operating in ventilated mode according to the invention, FIG. 3 shows a graph illustrating the changes over time of the pH and of the concentration of dissolved copper during implementation of the method according to the invention, FIG. 4 shows a graph illustrating the evolution of the coefficient of contamination of a stator treated by the method according to the invention.

In FIG. 1, a cooling device of the alternator stator is represented, operating in ventilated mode.

The water is driven by pump P and cooled by refrigerant R before passing through the hollow copper conductors of the alternator stator A. Then, after passing through the expansion tank E, it again enters the pump. Upstream of the alternator A part of the circulating water is diverted towards the demineralisation circuit, where it passes through a mixed-bed column MB before returning to the expansion tank.

In FIG. 2, a purification device according to the invention is represented. This device differs from that described in FIG. 1 in that a treatment circuit is superimposed in parallel on the demineralisation circuit. Here, the treatment circuit is a cation-exchanging resin CR and the demineralisation circuit is a mixed-bed.

EXAMPLE

The device according to the invention has been used on an alternator stator of a nuclear power station of 900 MW capacity cooled in ventilated mode, using a water circulation with a nominal flow through the stator of 140 m$^3$/h, an inflow rate into the demineralisation circuit of 6 m$^3$/h and an inflow rate into the treatment circuit of 20 m$^3$/h.

The maximum authorised value for the copper concentration is fixed at 160 ppb and the minimum value for pH is fixed at 6.

Thus, the cationic resin CR first functions alone, then, when the pH reaches 6 or the concentration of dissolved copper reaches 160 ppb, the demineralisation circuit is opened; then, when normal conditions are restored, the demineralisation circuit is closed.

The values for pH and Cu concentration were tracked for four months. The results are collected in the graph in FIG. 3.

The rate of corrosion observed during this operation was very low, of the order of max. 5 $\mu$m/year, whereas it is of the order of 25 to 150 $\mu$m/cleaning operation when chemical cleaning is used.

In addition, the contamination coefficient of the stator treated by cationic purification was monitored. The results are recorded in FIG. 4.

When the contamination coefficient reached its limit value (3. 10$^{-3}$) the treatment was followed for 4 further months. Then the cation-exchanging resin was replaced by a mixed-bed resin capable of treating at least 15% for the nominal flow. The demineralisation circuit was left open at this time (5% of nominal flow) so as to treat globally at least 20% of the nominal flow of water passing through the stator.

What is claimed is:

1. A method for purifying the cooling circuit of an alternator stator (A) operating in ventilated mode according to which the water of the closed cooling circuit of the alternator stator is drawn by a pump (P) from an expansion tank (E), cooled and, if necessary, filtered in order to supply hollow copper conductors of the alternator stator, wherein part of the water is diverted upstream of the alternator towards a deionization circuit feeding into an expansion reservoir, said deionization circuit comprising a mixed-bed demineralization circuit (MB) and a treatment circuit placed parallel to the demineralization circuit, and wherein:

when the inflow rate into the deionization circuit is fixed at a value less than 10% of the nominal flow passing through the stator, the treatment circuit consists of a cation-exchanging resin, when the inflow rate into the deionization circuit is fixed at a value greater than 10% of the nominal flow passing through the stator, either the treatment circuit is interrupted, or the treatment circuit consists of a cation-exchanging resin or the treatment circuit consists of a mixed-bed resin.

2. Method according to claim 1, wherein a mixed-bed column able to retain HCO$_3^-$ ions and Cu$^{2+}$ ions is used.

3. Method according to claim 1, wherein a cation-exchanging resin able to retain Cu$^{2+}$ ions is used.

4. Method according to claim 1, wherein when the water of the treatment circuit passes through a cation-exchanging resin, a cycle consisting of the following stages is implemented:

a) interrupt the demineralization circuit while maintaining circulation in the treatment circuit;

b) restore operation of the demineralization circuit while maintaining circulation in the treatment circuit.

5. Method according to claim 1, wherein, when the water of the treatment circuit passes through a cation-exchanging resin, a cycle consisting of the following stages is implemented:

a) interrupt the demineralization circuit while maintaining circulation in the treatment circuit;

b) restore operation of the demineralization circuit while maintaining circulation in the treatment circuit, and wherein the cycle of stages a) and b) is stopped and the cation-exchanging resin in the treatment circuit is replaced by a mixed-bed resin so chosen that the two mixed-bed resins in the parallel circuits are able to treat a flow greater than 10% of the nominal flow of water passing through the stator.

6. Method according to claim 5, wherein the two mixed-bed resins in the parallel circuits are able to treat a flow greater than or equal to 20% of the nominal flow of water passing through the stator.

7. Method according to claim 1, wherein when the treatment circuit consists of a mixed-bed resin:

either the inflow rate into the demineralization circuit has a value greater than 10% of the nominal flow passing through the stator and the treatment circuit is interrupted, or inversely, the inflow rate into the treatment circuit is greater than 10% of the nominal flow passing through the stator and the demineralization circuit is interrupted;

or both circuits are opened so that the water passes through both circuits.

8. Method according to claim 7, wherein:

either the inflow rate into the demineralization circuit has a value greater than 20% of the nominal flow passing through the stator and the treatment circuit is interrupted, or inversely, the inflow rate into the treatment circuit is greater than 20% of the nominal flow passing through the stator and the demineralization circuit is interrupted;

or both circuits are opened so that the water passes through both circuits.

9. Method according to claim 1, wherein the maximum authorized concentration of dissolved copper upstream of the deionization circuit is such that it does not allow precipitation of CuO.

10. Method according to claim 9, wherein said concentration is less than 200 ppb.

11. Method according to claim 9, wherein said concentration is less than 180ppb.

12. Method according to claim 9, wherein said concentration is less than 160 ppb.

13. Method according to claim 1, wherein the minimum authorized pH is 6, so as to avoid excessive corrosion of the hollow copper conductors.

14. Method for purifying the cooling circuit of an alternator stator (A) operating in ventilated mode according to which the water of the closed cooling circuit of the alternator stator is drawn by a pump (P) from an expansion tank (E), cooled and, if necessary, filtered in order to supply hollow copper conductors of the alternator stator, wherein part of the water is diverted upstream of the alternator towards a deionization circuit feeding into an expansion reservoir, said deionization circuit comprising a mixed-bed demineralization circuit (LM) and a treatment circuit placed parallel to the demineralization circuit, and wherein:

when the inflow rate into the deionization circuit is fixed at a value less than 20% of the nominal flow passing through the stator, the treatment circuit consists of a cation-exchanging resin, when the inflow rate into the deionization circuit is fixed at a value greater than 20% of the nominal flow passing through the stator, either the treatment circuit is interrupted, or the treatment circuit consists of a cation-exchanging resin, or the treatment circuit consists of a mixed-bed resin.

15. Method according to claim 14, wherein a mixed-bed column able to retain $HCO_3^-$ ions and $Cu^{2+}$ ions is used.

16. Method according to claim 14, wherein a cation-exchanging resin able to retain $Cu^{2+}$ ions is used.

17. Method according to claim 14, wherein when the water of the treatment circuit passes through a cation-exchanging resin, a cycle consisting of the following stages is implemented:

a) interrupt the demineralization circuit while maintaining circulation in the treatment circuit;

b) restore operation of the demineralization circuit while maintaining circulation in the treatment circuit.

18. Method according to claim 14, wherein when the water of the treatment circuit passes through a cation-exchanging resin, a cycle consisting of the following stages is implemented:

a) interrupt the demineralization circuit while maintaining circulation in the treatment circuit;

b) restore operation of the demineralization circuit while maintaining circulation in the treatment circuit, and wherein the cycle of stages a) and b) is stopped and the cation-exchanging resin in the treatment circuit is replaced by a mixed-bed resin so chosen that the two mixed-bed resins in the parallel circuits are able to treat a flow greater than 10% of the nominal flow of water passing through the stator.

19. Method according to claim 18, wherein the two mixed-bed resins in the parallel circuits are able to treat a flow greater than or equal to 20% of the nominal flow of water passing through the stator.

20. Method according to claim 14, wherein when the treatment circuit consists of a mixed-bed resin:

either the inflow rate into the demineralization circuit has a value greater than 10% of the nominal flow passing through the stator and the treatment circuit is interrupted, or inversely, the inflow rate into the treatment circuit has a value greater than 10% of the nominal flow passing through the stator and the demineralization circuit is interrupted;

or both circuits are opened so that the water passes through both circuits.

21. Method according to claim 20, wherein:

either the inflow rate into the demineralization circuit has a value greater than 20% of the nominal flow passing through the stator and the treatment circuit is interrupted, or inversely the inflow rate into the treatment circuit has a value greater than 20% of the nominal flow passing through the stator and the demineralization circuit is interrupted;

or both circuits are opened so that the water passes through both circuits.

22. Method according to claim 14, wherein the maximum authorized concentration of dissolved copper upstream of the deionization circuit is such that it does not allow precipitation of CuO.

23. Method according to claim 22, wherein said concentration is less than 200 ppb.

24. Method according to claim 22, wherein said concentration is less than 180 ppb.

25. Method according to claim 22, wherein said concentration is less than 160 ppb.

26. Method according to claim 14, wherein the minimum authorized pH is 6, so as to avoid excessive corrosion of the hollow copper conductors.

27. A device for purifying the cooling circuit of an alternator stator operating in ventilated mode, consisting of a closed circuit for the circulation of cooling water in hollow copper conductors of the alternator stator, comprising a pump, a cooling device, if necessary a filter, the alternator, an expansion tank and a deionization circuit placed upstream of the alternator and feeding into the expansion tank, said deionization circuit comprising a demineralization circuit and a treatment circuit parallel to the demineralization circuit, wherein:

when the inflow rate into the deionization circuit is less than 10% of the nominal flow of water passing through the stator, the treatment circuit consists of a cation-exchanging resin, when the inflow rate into the deionization circuit is greater than 10% of the nominal flow of water passing through the stator, the treatment circuit consists either of a mixed-bed resin or of a cation-exchanging resin.

28. Device according to claim 27, wherein there are means allowing the demineralization circuit to be opened or closed while keeping the treatment circuit open, and inversely, allowing the treatment circuit to be opened or closed while keeping the demineralization circuit open.

29. Device according to claim 27, wherein when the inflow rate into the deionization circuit is greater than 10% of the nominal flow passing through the stator, the demineralization circuit and the treatment circuit consist of mixed-bed resins each able to treat at least 10% of the nominal flow of water passing through the stator.

30. Device according to claim 29, wherein when the inflow rate into the deionization circuit is greater than 20% of the nominal flow passing through the stator, the demineralization circuit and the treatment circuit consist of mixed-bed resins each able to treat at least 20% of the nominal flow of water passing through the stator.

31. Device according to claim 27, wherein there are means for monitoring the concentration of dissolved copper upstream of the purification circuit and means for monitoring the pH of the cooling water.

32. Device according to claim 27, wherein the mixed-bed column is able to retain $HCO_3^-$ ions and $Cu^{2+}$ ions.

33. Device according to claim 27, wherein the cationic resin is able to retain $Cu^{2+}$ ions.

34. A device for purifying the cooling circuit of an alternator stator operating in ventilated mode, consisting of a closed circuit for the circulation of cooling water in hollow copper conductors of the alternator stator, comprising a pump, a cooling device, if necessary a filter, the alternator, an expansion tank and a deionization circuit placed upstream of the alternator and feeding into the expansion tank, said deionization circuit comprising a demineralization circuit and a treatment circuit parallel to the demineralization circuit, wherein:

when the inflow rate into the deionization circuit is less than 20% of the nominal flow of water passing through the stator, the treatment circuit consists of a cation-exchanging resin, when the inflow rate into the deionization circuit is greater than 20% of the nominal flow of water passing through the stator, the treatment circuit consists of a mixed-bed resin or a cation-exchanging resin.

35. Device according to claim 34, wherein there are means allowing the demineralization circuit to be opened or closed while keeping the treatment circuit open, and inversely, allowing the treatment circuit to be opened or closed while keeping the demineralization circuit open.

36. Device according to claim 34, wherein when the inflow rate into the deionization circuit is greater than 10% of the nominal flow passing through the stator, the demineralization circuit and the treatment circuit consist of mixed-bed resins each able to treat at least 10% of the nominal flow of water passing through the stator.

37. Device according to claim 36, wherein when the inflow rate into the deionization circuit is greater than 20% of the nominal flow passing through the stator, the demineralization circuit and the treatment circuit consist of mixed-bed resins each able to treat at least 20% of the nominal flow of water passing through the stator.

38. Device according to claim 36, wherein there are means for monitoring the concentration of dissolved copper upstream of the purification circuit and means for monitoring the pH of the cooling water.

39. Device according to claim 36, wherein the mixed-bed column is able to retain $HCO_3^-$ ions and $Cu^{2+}$ ions.

40. Device according to claim 36, wherein the cationic resin is able to retain $Cu^{2+}$ ions.

* * * * *